United States Patent [19]

Barthel et al.

[11] Patent Number: 5,268,441

[45] Date of Patent: Dec. 7, 1993

[54] ONE-COMPONENT RTV COMPOSITIONS

[75] Inventors: Herbert Barthel, Emmerting; Werner Graf, Burghausen, both of Fed. Rep. of Germany

[73] Assignee: Wacker-Chemie GmbH, Munich, Fed. Rep. of Germany

[21] Appl. No.: 979,742

[22] Filed: Nov. 23, 1992

[30] Foreign Application Priority Data

Nov. 28, 1991 [DE]  Fed. Rep. of Germany ....... 4139148

[51] Int. Cl.$^5$ ............................................. C08G 77/08
[52] U.S. Cl. ....................................... 528/17; 528/34; 523/212; 524/863
[58] Field of Search ............... 528/17, 34; 523/216, 523/200, 212; 524/863

[56] References Cited

U.S. PATENT DOCUMENTS

| 3,077,465 | 9/1959 | Bruner .................................. 528/17 |
| 3,845,161 | 10/1974 | Beers . |
| 4,111,890 | 9/1978 | Getson et al. ...................... 428/447 |
| 4,141,751 | 2/1979 | Moreland ............................ 106/308 |
| 4,164,509 | 11/1977 | Läufer . |
| 4,525,565 | 7/1983 | Laisney et al. ..................... 528/17 |
| 4,680,364 | 7/1987 | Lucas .................................. 528/15 |
| 4,722,967 | 2/1988 | Beers et al. ........................ 524/860 |
| 4,871,616 | 10/1989 | Kimura et al. ..................... 428/407 |

FOREIGN PATENT DOCUMENTS

| 0102268 | 7/1983 | European Pat. Off. . |
| 0188285 | 7/1986 | European Pat. Off. . |
| 2057730 | 11/1970 | France . |

*Primary Examiner*—Ralph H. Dean

[57] ABSTRACT

Compositions which have a long shelf life in the absence of water, but crosslink in the presence of water at room temperature to form elastomers which are prepared by mixing (1) an organopolysiloxane containing condensable terminal groups with (2) an organosilicon compound containing at least three hydrolyzable groups per molecule which are bonded directly to silicon, (3) a condensation catalyst and, optionally, at least one additional substance, in which the condensation catalyst (3), is a reaction product obtained from the reaction of a finely divided, inorganic oxide with a reactive titanium compound.

9 Claims, No Drawings

ONE-COMPONENT RTV COMPOSITIONS

The invention relates to silicone compositions which have a long shelf life in the absence of water, but crosslink in the presence of water at room temperature to form elastomers. These compositions are known as one-component RTV compositions, which contain (1) an organopolysiloxane containing condensable terminal groups,
(2) an organosilicon compound containing at least three hydrolyzable groups per molecule which are bonded directly to silicon,
(3) a condensation catalyst and, if desired, at least one additional substance.

BACKGROUND OF THE INVENTION

Compositions which have a long shelf life in the absence of water, but crosslink in the presence of water at room temperature to form elastomers and which eliminate acetic acid during crosslinking and contain organotin compounds as condensation catalyst are disclosed, for example, in U.S. Pat. No. 3,077,465 (published Feb. 12, 1963, L. B. Bruner et al., Dow Corning Corp.). Since organotin compounds are toxic, elastomers prepared in this manner cannot be employed without restrictions, for example, in the foodstuffs sector.

U.S. Pat. No. 4,525,565 (published Jun. 25, 1985, B. Laisney et al., Rhone-Poulenc Specialities Chimiques) and the corresponding EP 102,268 disclose compositions which have a long shelf life in the absence of water, but crosslink in the presence of water at room temperature to give elastomers and which are prepared by mixing the following constituents:

(A) A diorganopolysiloxane containing terminal hydroxyl groups,
(B) a silane containing at least three acyloxy groups or oxime groups bonded directly to silicon per molecule,
(C) an organotitanium compound containing at least one organosilicon radical which is bonded to each titanium atom by a Ti-O-Si bond, as condensation catalyst, and
(D) a filler The organotitanium compounds, such as tetra(trimethylsiloxy)titanium or bis(trimethylsiloxy)dibutoxytitanium, are soluble in the one-component RTV compositions, i.e., the crosslinking of the compositions is homogeneously catalyzed.

DE 20 57 730 (published on Jun. 16, 1977, S. Läufer, Deutsche Gold- und Silber-Scheideanstalt, previously Roessler) and the corresponding U.S. Pat. No. 4,164,509 describe a process for rendering finely divided oxides, for example pyrogenic silicic acid, hydrophobic, in which the finely divided oxides are treated with ester compounds, and dry ammonia gas is passed through the product. Suitable ester compounds mentioned are alkoxysilanes, such as tetra-n-butoxy silane, and the corresponding compounds of titanium.

It is an object of the present invention to provide compositions which have a long shelf life in the absence of water, but crosslink in the presence of water at room temperature to form elastomers. Another object of the present invention is to provide compositions having a long shelf life in the absence of water, but crosslink in the presence of water at room temperature to form elastomers, which contain a condensation catalyst which is significantly less toxic to non-toxic. Another object of the present invention is to provide a condensation catalyst which accelerates the crosslinking of the compositions by heterogeneous catalysis. A further object of the present invention is to provide a condensation catalyst whose catalytic activity is not impaired even by storage in the presence of atmospheric moisture over an extended period. A still further object of the present invention is to provide a condensation catalyst which is easy to prepare.

SUMMARY OF THE INVENTION

The above objects and others which will become apparent from the following description are accomplished in accordance with this invention, generally speaking by providing compositions which have a long shelf life in the absence of water, but crosslink in the presence of water at room temperature to form elastomers which comprises mixing (1) an organopolysiloxane containing condensable terminal groups with (2) an organosilicon compound containing per molecule at least three hydrolyzable groups bonded directly to silicon, (3) a condensation catalyst and optionally, at least one additional substance, wherein the condensation catalyst (3) is a product obtained from the reaction of a finely divided, inorganic oxide with a reactive titanium compound.

DETAILED DESCRIPTION OF THE INVENTION

The condensation catalyst (3) is preferably prepared by reacting a finely divided, inorganic oxide with a reactive titanium compound in amounts of from 0.01 to 50 parts, preferably from 0.1 to 10 parts, of titanium compound per 100 parts of finely divided inorganic oxide, optionally in the presence of an inert organic solvent, at from 0° to 300° C., and more preferably from 20° to 100° C., for a period of from 1 minute to 24 hours, and more preferably for from 15 to 60 minutes.

The reaction product is preferably prepared under the pressure of the ambient atmosphere, i.e., at about 1020 hPa (abs.); however, it is also possible to use higher or lower pressures.

The reactive titanium compound can be employed as a solution in an inert organic solvent. The inorganic oxide can also be employed as a dispersion in an inert organic solvent.

If an inert, organic solvent is used during the preparation of the reaction product, it can be removed from the reaction product, preferably by distillation, at from 0° to 150° C. and from 0.01 to 1,000 hPa (abs.).

The resultant reaction product of this invention is a pulverulent, insoluble, finely divided solid. Free titanium compounds cannot be extracted from this reaction product using nonpolar or polar solvents, such as, for example, toluene or acetone. Compositions which contain, as catalyst, a reaction product containing free and unbound titanium compounds as a consequence of using an excess amount of titanium compound, tend to gel and do not form useable elastomers.

While organic titanium compounds, such as tetra-n-butoxytitanium, hydrolyze in a short period with atmospheric moisture to give catalytically inactive titanium dioxide, the reaction product of this invention retains its catalytic activity, even after extended storage, without particular protection against atmospheric moisture. The compositions of this invention also have a long shelf life in the absence of moisture.

The finely divided inorganic oxide preferably employed for the preparation of the reaction product of this invention has a particle size of less than 10 μm, preferably less than 0.1 μm.

Examples of finely divided inorganic oxides are silicon dioxide, aluminum oxide, titanium dioxide, quartz sand, mica, iron oxide, zinc oxide, magnesium oxide, zirconium dioxide, and silicates, such as calcium silcate or aluminum silicate.

Preferred examples of finely divided inorganic oxides are silicon dioxides having a specific surface area of at least 50 m²/g (determined by nitrogen adsorption in accordance with ASTM Special Technical Publication 51, 1941, page 95 ff, i.e., by the so-called "BET method"), preferably from 50 to 500 m²/g, especially from 100 to 300 m²/g, and in particular pyrogenically produced silicon dioxides, silicic acid hydrogels which have been dewatered with retention of the structure, i.e., so-called "aerogels", and other types of precipitated silicon dioxide.

The reactive titanium compound preferably employed in the preparation of the reaction product has the general formula $TiX_4$ where X is a radical of the formula —OR or

in which R is an alkyl radical having from 1 to 12 carbon atoms per radical, or one radical X is a chelate ligand selected from the group consisting of substituted or unsubstituted acetylacetonates, β-diketo groups and β-ketoester groups, or two radicals X together are a dihydric alcohol as chelate ligand.

The substituted or unsubstituted acetylacetonates used are preferably those of the formula

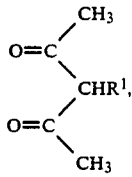

where $R^1$ is a hydrogen atom or a monovalent hydrocarbon radical having from 1 to 12 carbon atoms per radical, The dihydric alcohol used is preferably one of the formula

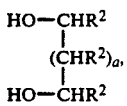

where the $R^2$ radicals are the same or different and are hydrogen atoms or monovalent hydrocarbon radicals having from 1 to 12 carbon atoms per radical, and a is 0, 1 or 2.

Examples of alkyl radicals represented by R are the methyl, ethyl, n-propyl, iso-propyl, n-butyl, iso-butyl, tert-butyl, n-pentyl, iso-pentyl, neo-pentyl and tert-pentyl radicals; hexyl radicals, such as the n-hexyl radical; heptyl radicals, such as the n-heptyl radical; octyl radicals, such as the n-octyl radical and iso-octyl radicals, such as the 2,2,4-trimethylpentyl radical; nonyl radicals, such as the n-nonyl radical; decyl radicals, such as the n-decyl radical; undecyl radicals, such as the n-undecyl radical, and dodecyl radicals, such as the n-dodecyl radical. A preferred example of R is the n-butyl radical.

Examples of hydrocarbon radicals represented by $R^1$ are alkyl radicals, such as the methyl, ethyl, n-propyl, iso-propyl, n-butyl, iso-butyl and tert-butyl, n-pentyl, iso-pentyl, neo-pentyl and tert-pentyl radicals; hexyl radicals, such as the n-hexyl radical; heptyl radicals, such as the n-heptyl radical; octyl radicals, such as the n-octyl radical, and iso-octyl radicals, such as the 2,2,4-tri-methylpentyl radical; nonyl radicals, such as the n-nonyl radical; decyl radicals, such as the n-decyl radical; undecyl radicals, such as the n-undecyl radical; dodecyl radicals, such as the n-dodecyl radical; alkenyl radicals, such as the allyl radical; aryl radicals, such as the phenyl radical; alkaryl radicals, such as o-, m- and p-tolyl radicals; and aralkyl radicals, such as the benzyl radical. The preferred example of $R^1$ is the hydrogen atom.

Examples of hydrocarbon radicals represented by $R^2$ are alkyl radicals, such as the methyl, ethyl, n-propyl, iso-propyl, n-butyl, iso-butyl and tert-butyl, n-pentyl, iso-pentyl, neo-pentyl and tert-pentyl radicals; hexyl radicals, such as the n-hexyl radical; heptyl radicals, such as the n-heptyl radical; octyl radicals, such as the n-octyl radical, and iso-octyl radicals, such as the 2,2,4-trimethylpentyl radical; nonyl radicals, such as the n-nonyl radical; decyl radicals, such as the n-decyl radical; undecyl radicals, such as the n-undecyl radical; dodecyl radicals, such as the n-dodecyl radical; alkenyl radicals, such as the allyl radical; aryl radicals, such as the phenyl radical; alkaryl radicals, such as o-, m- and p-tolyl radicals; and aralkyl radicals, such as the benzyl radical. The preferred example of $R^2$ are the hydrogen atom or the methyl radical.

In the reaction product of this invention, the filler and the condensation catalyst are combined as a single component. The novel product obtained from the reaction of a finely divided inorganic oxide with a reactive titanium compound or the finely divided inorganic oxide employed in the preparation of the reaction product may be rendered hydrophobic by means of a hydrophobicizer, preferably an organosilicon compound. The organosilicon compound employed is preferably one of the formula $R^3_{4-x}SiA_x$ or $(R^3_3Si)_yB$, in which the $R^3$ radicals are the same or different and are monovalent hydrocarbon radicals having from 1 to 18 carbon atoms per radical, A is halogen, —OH, —$OR^4$ or —$OCOR^4$, B is $NR^5_{3-y}$, $R^4$ is a monovalent hydrocarbon radical having from 1 to 12 carbon atoms per radical, $R^5$ is a hydrogen atom or the same as $R^4$, x is 1, 2 or 3 and y is 1 or 2, or an organo(poly)siloxane comprising units of the formula $R^3_zSiO_{(4-z)/2}$ where $R^3$ is the same as above, and z is 1, 2 or 3.

Examples of radicals represented by $R^3$ are alkyl radicals, such as the methyl, ethyl, n-propyl, iso-propyl, n-butyl, iso-butyl and tert-butyl, n-pentyl, iso-pentyl, neo-pentyl and tert-pentyl radicals; hexyl radicals, such as the n-hexyl radical; heptyl radicals, such as the n-heptyl radical; octyl radicals, such as the n-octyl radical, and iso-octyl radicals, such as the 2,2,4-trimethylpentyl radical; nonyl radicals, such as the n-nonyl radical; decyl radicals, such as the n-decyl radical; dodecyl radicals, such as the n-dodecyl radical; and octadecyl radicals, such as the n-octadecyl radical; alkenyl radicals, such as the vinyl and allyl radicals; cycloalkyl radicals, such as cyclopentyl, cyclohexyl and cycloheptyl radicals, and methyl cyclohexyl radicals; aryl radicals, such as the phenyl, naphthyl, anthryl and phenanthryl radicals; alkaryl radicals, such as o-, m- and p-tolyl radicals; xylyl radicals and ethyl phenyl radicals; and aralkyl radicals, such as the benzyl radical and the alpha- and β-phenylethyl radicals.

Examples of radicals represented by $R^4$ are alkyl radicals, such as the methyl, ethyl, n- propyl, iso-propyl, n-butyl, iso-butyl, tert-butyl, n-pentyl, iso-pentyl, neopentyl and tert-pentyl radicals; hexyl radicals, such as the n-hexyl radical; heptyl radicals, such as the n-heptyl radical; octyl radicals, such as the n-octyl radical, and iso-octyl radicals, such as the 2,2,4-trimethylpentyl radical; nonyl radicals, such as the n-nonyl radical; decyl radicals, such as the n-decyl radical; and dodecyl radicals, such as the n-dodecyl radical; aryl radicals, such as the phenyl radical; alkaryl radicals, such as o-, m- and p-tolyl radicals; and aralkyl radicals, such as the benzyl radical. Preferred examples of $R^4$ are the methyl and ethyl radicals.

Examples of organosilicon compounds are alkylchlorosilanes, such as methyltrichlorosilane, dimethyldichlorosilane, trimethylchlorosilane, octyltrichlorosilane, octadecyltrichlorosilane, octylmethyldichlorosilane, octadecylmethyldichlorosilane, octyldimethylchlorosilane, octadecyldimethylchlorosilane and tert-butyldimethylchlorosilane; alkylalkoxysilanes, such as dimethyldimethoxysilane, dimethyldiethoxysilane, trimethylmethoxysilane and trimethylethoxysilane; trimethylsilanol; cyclic diorgano(poly)siloxanes, such as cyclic dimethyl(poly)siloxanes, and linear diorganopolysiloxanes, such as dimethylpolysiloxanes which are end-blocked by trimethylsiloxy groups, and dimethylpolysiloxanes containing terminal hydroxyl or alkoxy groups.

The inorganic oxides which have been rendered hydrophobic preferably contain from 1 to 10% by weight of organosilicon compounds.

Processes for rendering materials hydrophobic are described, for example, in DE 11 63 784.

The inert, organic solvent used is preferably a saturated hydrocarbon, such as pentane, hexane, heptane, decane or a mixture thereof, such as a mineral oil, or an aromatic hydrocarbon, such as toluene, xylene, ethyl benzene or a mixture thereof, or an aliphatic alcohol, such as methanol, ethanol, propanol, butanol, pentanol, hexanol or octanol, or a mixture thereof.

The condensation catalyst (3) is preferably employed in an amount of from 0.01 to 100 parts, in particular from 0.1 to 50 parts, based on 100 parts of organopolysiloxane (1).

The organopolysiloxane (1) containing condensable terminal groups is preferably one of the general formula $HO(SiR^6{}_2O)_mSiR^6{}_2OH$, where the radicals $R^6$ are the same or different and are substituted or unsubstituted monovalent hydrocarbon radicals having from 1 to 18 carbon atoms per radical, and m is an integer having a value of at least 10.

Within or along the siloxane chains of the above mentioned formula, other siloxane units may be present in addition to the diorganosiloxane units ($SiR^6{}_2O$), which are usually not shown in formulas of this type. Examples of other siloxane units of this type, which are usually present as impurities, are those of the formulas $R^6SiO_{3/2}$, $R^6{}_3SiO_{1/2}$ and $SiO_{4/2}$, where $R^6$ is the same as above. However, the amount of siloxane units of this type other than diorganosiloxane units is preferably at most 10 mol percent, and more preferably at most 1 mol percent, based on the weight of the organopolysiloxanes (1).

The organopolysiloxanes (1) preferably have a viscosity of from 100 to 500,000 mPa.s at 25° C.

It is possible to employ one type of organopolysiloxane (1) or a mixture of at least two types of organopolysiloxane (1).

Examples of radical $R^6$ are alkyl radicals, such as the methyl, ethyl, n-propyl, iso-propyl, n-butyl, iso-butyl, tert-butyl, n-pentyl, iso-pentyl, neo-pentyl and tert-pentyl radicals; hexyl radicals, such as the n-hexyl radical; heptyl radicals, such as the n-heptyl radical; octyl radicals, such as the n-octyl radical, and iso-octyl radicals, such as the 2,2,4-trimethylpentyl radical; nonyl radicals, such as the n-nonyl radical; decyl radicals, such as the n-decyl radical; dodecyl radicals, such as the n-dodecyl radical; and octadecyl radicals, such as the n-octadecyl radical; alkenyl radicals, such as the vinyl and allyl radicals; cycloalkyl radicals, such as cyclopentyl, cyclohexyl and cycloheptyl radicals, and methyl cyclohexyl radicals; aryl radicals, such as the phenyl, naphthyl, anthryl and phenanthryl radicals; alkaryl radicals, such as o-, m- and p-tolyl radicals, xylyl radicals and ethyl phenyl radicals and aralkyl radicals, such as the benzyl radical and the alpha- and β-phenylethyl radicals.

Examples of substituted radicals represented by $R^6$ are cyanalkyl radicals, such as the β-cyanethyl radical, and halogenated hydrocarbon radicals, for example haloalkyl radicals, such as the 3,3,3-trifluoro-n-propyl radical, the 2,2,2,2',2',2'-hexafluoroisopropyl radical and the heptafluoroisopropyl radical, and haloaryl radicals, such as the o-, m- and p-chlorophenyl radicals.

A preferred example of the radical $R^6$ is the methyl radical.

The organosilicon compound (2) containing at least three hydrolyzable groups per molecule which are bonded directly to silicon is preferably a silane of the general formula $R^6{}_{4-n}SiZ_n$ or a partial hydrolyzate thereof containing 2 to 10 silicon atoms per molecule, where $R^6$ is the same as above, n is 3 or 4, and the radicals Z are the same or different hydrolyzable groups and are selected from the group consisting of acyloxy groups —$OCOR^7$ and substituted or unsubstituted hydrocarbonoxy groups —$OR^8$, in which $R^7$ is a monovalent hydrocarbon radical having from 1 to 12 carbon atoms per radical, and $R^8$ is an alkyl radical which has from 1 to 4 carbon atoms per radical and may b substituted by an ether oxygen atom.

The hydrolyzable group Z is preferably the acyloxy group.

The organosilicon compound (2) is preferably employed in an amount of from 2 to 10 parts per 100 parts of organopolysiloxane (1).

Examples of radicals represented by $R^7$ are alkyl radicals, such as the methyl, ethyl, n-propyl, iso-propyl, n-butyl, iso-butyl, tert-butyl, n-pentyl, iso-pentyl, neopentyl and tert-pentyl radicals; hexyl radicals, such as the n-hexyl radical; heptyl radicals, such as the n-heptyl radical; octyl radicals, such as the n-octyl radical, and iso-octyl radicals, such as the 2,2,4-trimethylpentyl radical; nonyl radicals, such as the n-nonyl radical; decyl radicals, such as the n-decyl radical; dodecyl radicals, such as the n-dodecyl radical; cycloalkyl radicals, such as cyclopentyl, cyclohexyl and cycloheptyl radicals, and methyl cyclohexyl radicals; aryl radicals, such as the phenyl and naphthyl radicals; alkaryl radicals, such as o-, m- and p-tolyl radicals, xylyl radicals and ethyl phenyl radicals, and aralkyl radicals, such as the benzyl radical and the alpha and β-phenylethyl radicals.

A preferred example of the radical $R^7$ is the methyl radical.

Examples of alkyl radicals represented by $R^8$ are methyl, ethyl, n-propyl, iso-propyl, 1-n-butyl, 2-n-butyl, iso-butyl and tert-butyl radicals. Examples of alkyl radicals represented by $R^8$ which are substituted by an ether oxygen atom are the ethoxy methyl, 2-methoxyethyl, 2-ethoxyethyl and propoxymethyl radicals. Preferred examples of $R^8$ radicals are the methyl and ethyl radicals.

It is possible to employ one type of silane or a mixture of at least two types of silanes, or partial hydrolyzates thereof.

In addition to components (1), (2) and (3), the compositions of this invention may, if desired, contain additional substances. Examples of additional substances are fillers, such as reinforcing and nonreinforcing fillers, plasticizers, pigments, soluble dyes, fragrances, fungicides, resinous organopolysiloxanes, purely organic resins, corrosion inhibitors, oxidation inhibitors, heat stabilizers, solvents, agents for affecting the electrical properties, such as conductive black, flameproofing agents, light stabilizers and agents for extending the skinning time.

Examples of fillers are reinforcing fillers, i.e., fillers having a specific BET surface area of at least 50 m²/g, preferably 50-500 m²/g, such as pyrogenically produced silicon dioxides, silicic acid hydrogels which have been dewatered with retention of the structure, i.e., so-called "aerogels", and other types of precipitated silicon dioxide; and nonreinforcing fillers, i.e., fillers having a specific BET surface area of less than 50 m²/g, such as quartz sand, diatomaceous earth, calcium silicate, zirconium silicate, zeolites, iron oxide, zinc oxide, titanium dioxide, aluminum oxide, calcium carbonate, magnesium carbonate, zinc carbonate, carbon black, mica and chalk. The fillers may have been rendered hydrophobic by treatment with hydrophobicizers, for example by treatment with organosilanes, organosilazanes or organosiloxanes. It is possible to employ only one type of filler, or it is possible to employ a mixture of at least two fillers.

The filler is preferably employed in amounts of from 0 to 200 parts, and more preferably from 0 to 50 parts, based on 100 parts of organopolysiloxane (1).

Examples of plasticizers are diorganopolysiloxanes which are endblocked by triorganosiloxy groups and are liquid at room temperature, such as dimethylpolysiloxanes which are end-blocked by trimethylsiloxy groups and having viscosity of from 10 to 10,000 mPas at 25° C.

The plasticizer is preferably employed in amounts of from 0 to 50 parts, and more preferably from 0 to 10 parts, based on 100 parts of organopolysiloxane (1).

In preparing the compositions of this invention, all constituents of the particular composition can be mixed with one another in any desired sequence. This mixing is preferably carried out at room temperature, and contact with water is preferably avoided during this mixing. If desired, however, this mixing can also be carried out at elevated temperatures, for example at a temperature in the range of from 25° to 80° C.

The usual water content of air is sufficient for cross-linking the compositions of this invention. If desired, the crosslinking can also be carried out at temperatures higher than room temperature, for example at from 25° to 120° C., or at temperatures lower than room temperature, for example at from −10° to 25° C. It is also possible to carry out the crosslinking at water concentrations which exceed the normal water content of air.

The compositions of this invention are suitable as sealants for joints, including vertical joints and similar gaps with separations of, for example, from 10 to 40 mm, for example of buildings, land, water and air vehicles, or as adhesives and putties, for example in glazing, or for the production of protective coatings, including those for surfaces exposed to the constant action of fresh water or sea water, or for the production of coatings which repel adhesive substances, including those for substrates which come into contact with foodstuffs, for example packaging material intended for the storage and/or transport of sticky foodstuffs, such as cakes, honey, confectionery and meat, or for other applications in which it was possible to employ the heretofore known compositions which crosslink at room temperature to give elastomers, such as for the insulation of electrical or electronic devices.

Preparation of the Condensation Catalysts

A. One g of monomeric tetra-n-butoxytitanium dissolved in 1 g of n-hexane, and 10 g of hexamethyldisilazane are admixed at 25° C. with stirring with 100 g of a pyrogenic silicic acid having a specific BET surface area of 150 m²/g. The mixture is homogenized at 25° C. for 30 minutes, and the solvent is removed by distillation at 30° C. at 1 hPa (abs.), giving a white powder.

B. The procedure of A is repeated, except that 1 g of tetraisopropoxytitanium is substituted for 1 g of tetra-n-butoxytitanium. A white powder is obtained.

C. The procedure of A is repeated, except that 1 g of diisopropoxytitanium bis(acetylacetonate) dissolved in 2 g of isopropanol is substituted for 1 g of tetra-n-butoxytitanium. The mixture is homogenized at 25° C. for one hour, and then additionally conditioned for 2 hours at 80° C. in a drying cabinct. A white powder is obtained.

D. Five g of monomeric tetra-n-butoxytitanium dissolved in 5 g of mineral oil (commercially available under the trade name "Kristallöl K 30" from Shell) are admixed at 25° C. with stirring with 100 g of a pyrogenic silicic acid having a specific BET surface area of 150 m²/g. The mixture is homogenized at 25° C. for 30 minutes, giving a white powder.

E. The procedure of D is repeated, except that 25 g of tetra-n-butoxytitanium dissolved in 25 g of mineral oil are substituted for 5 g of tetra-n-butoxytitanium dissolved in 5 g of mineral oil. A white powder is obtained.

F. The procedure of D is repeated, except that pyrogenic silicic acid having a specific BET surface area of 150 m²/g which has been rendered hydrophobic (commercially available under the trade name "HDK H20" from Wacker-Chemie GmbH), by treating with dimethyldichlorosilane, and contains dimethylsiloxy groups which are chemically bonded to the surface, is used and the mineral oil is omitted. A white powder is obtained G. The procedure of D is repeated, except that 5 g of a dimethylpolysiloxane which is end-blocked by trimethylsiloxy groups and which has a viscosity of 10 mPas at 25° C. are admixed at 25° C. with the pyrogenic silicic acid, and the mineral oil is omitted. A white powder is obtained.

H. Ten g of monomeric tetra-n-butoxytitanium are added dropwise at 25° C. to a suspension containing 100 g of a precipitated silicic acid having a specific BET surface area of 170 m²/g (commercially available under the trade name "Ultrasil VN3" from Degussa) in 1000 g of n-hexane. The mixture is homogenized for one hour at 25° C., and the n-hexane is removed by distillation at 30° C. at 100 hPa (abs.), giving a white powder.

I. The procedure of H is repeated, except that 100 g of finely divided quartz sand (commercially available under the trade name "Silbond 600 TST" from Quarzwerke Frechen) are substituted for 100 g of precipitated silicic acid, and 1 g of tetra-n-butoxytitanium is used instead of 10 g. A white powder is obtained.

J. The procedure of H is repeated, except that 100 g of the colored pigment Iron Oxide Red (commercially available under the trade name "Eisenoxid Rot" from Bayer) are substituted for 100 g of precipitated silicic acid, and 1 g of tetra-n-butoxytitanium is used instead of 10 g. A red powder is obtained.

The analytical data for powders A to J (after the powders have been dried at 30° C. and 1 hPa for a period of 2 hours) are summarized in Table 1.

TABLE 1

| Catalyst | Carbon content (% by weight) | Titanium content (% by weight) | Water wettability |
|---|---|---|---|
| A | 2.3 | 0.2 | no |
| B | 2.2 | 0.3 | no |
| C | 2.5 | 0.2 | no |
| D | 1.3 | 0.8 | yes |
| E | 5.1 | 3.9 | yes |
| F | 1.6 | 0.9 | no |
| G | 2.5 | 0.7 | no |
| H | 3.4 | 1.4 | yes |
| I | 0.2 | 0.2 | yes |
| J | 0.2 | 0.2 | yes |

Powders A to J are each extracted with toluene and with acetone and the soluble titanium content is determined. The results are summarized in Table 2.

TABLE 2

| Catalyst | Extraction with toluene Titanium in mg/g of $SiO_2$ | Extraction with acetone Titanium in mg/g of $SiO_2$ |
|---|---|---|
| A | <0.01 | <0.01 |
| B | <0.01 | <0.01 |
| C | <0.01 | <0.01 |
| D | <0.01 | <0.01 |
| E | 0.15 | 0.16 |
| F | <0.01 | <0.01 |
| G | <0.01 | <0.01 |
| H | <0.01 | <0.01 |
| I | <0.01 | <0.01 |
| J | <0.01 | <0.01 |

EXAMPLES 1 TO 3

Five g of ethyltriacetoxysilane and in each case 20 g of catalyst A, B or C are added at 25° C. with the exclusion of moisture to a mixture containing 40 g of an α,w-dihydroxydimethylpolysiloxane having a viscosity of 80,000 mPa.s at 25° C., 20 g of an α,w-dihydroxydimethylpolysiloxane having a viscosity of 20,000 mPa.s at 25° C. and 50 g of an α,w-dihydroxydimethylpolysiloxane having a viscosity of 1000 mPa.s at 25° C. in a laboratory mixer. The resultant compositions are applied as layers 2 mm in thickness on a smooth substrate and left to crosslink at 25° C. and 50% relative atmospheric humidity for a total of 14 days. The skinning time is determined, i.e., the time which passes until a skin has formed on the samples. The Shore A hardness in accordance with DIN 53505, the tear strength and the elongation at break in accordance with DIN 53504 using an S 3A standard bar are then determined for these elastomers. The results are summarized in Table 3.

EXAMPLES 4 to 10

Five g of ethyltriacetoxysilane and in each case 2 g of catalyst D to J are added at 25° C. with the exclusion of moisture to a mixture containing 40 g of an α,w-dihydroxydimethylpolysiloxane having a viscosity of 80,000 mPa.s at 25° C., 20 g of an α,w-dihydroxydimethylpolysiloxane having a viscosity of 20,000 mPa.s at 25° C., 50 g of an α,w-dihydroxydimethylpolysiloxane having a viscosity of 1000 mPa.s at 25° C. and 20 g of pyrogenic silicic acid having a specific BET surface area of 150 m²/g which has been rendered hydrophobic by treatment with hexamethyldisilazane, in a laboratory mixer. The resultant compositions are applied as layers 2 mm in thickness on a smooth substrate and left to crosslink at 25° C. and 50% relative atmospheric humidity for a total of 14 days. The skinning time is determined, i.e., the time which passes until a skin has formed on the samples. The Shore A hardness in accordance with DIN 53505, the tear strength and the elongation at break in accordance with DIN using an S 3A standard bar are then determined for these elastomers. The results are summarized in Table 3.

TABLE 3

| Example | Skinning time (min) | Shore A hardness | Tear strength (N/mm²) | Elongation at break (%) |
|---|---|---|---|---|
| 1 | 10 | 35 | 2.6 | 330 |
| 2 | 11 | 30 | 2.2 | 350 |
| 3 | 12 | 31 | 2.3 | 320 |
| 4 | 14 | 31 | 2.1 | 380 |
| 5* | — | — | — | — |
| 6 | 11 | 34 | 2.6 | 330 |
| 7 | 10 | 31 | 2.2 | 320 |
| 8 | 9 | 36 | 2.3 | 290 |
| 9 | 14 | 24 | 2.2 | 390 |
| 10 | 15 | 22 | 2.1 | 400 |

*The mixture gels even before contact with moisture

EXAMPLE 11

A mixture containing catalyst A is prepared in accordance with the procedure described in Example 1. The composition is stored in the absence of moisture for 1 month at 50° C. and for 1 year at 25° C. The crosslinking of the composition, the determination of the skinning time and the determination of the mechanical values of the elastomer are then carried out as described under Example 1. The results are summarized in Table 4.

TABLE 4

| Storage of the composition | Skinning time (min) | Shore A hardness | Tear strength (N/mm²) | Elongation at break (%) |
|---|---|---|---|---|
| 1 month at 50° C. | 10 | 29 | 2.3 | 320 |
| 1 year at 25° C. | 9 | 28 | 2.3 | 340 |

EXAMPLE 12

Catalyst A is stored for 1 year at 25° C. in a sealed drum, but without particular protection against moisture. A mixture is subsequently prepared in accordance with the procedure in Example 1. The crosslinking of the composition, the determination of the skinning time and the determination of the mechanical values of the elastomer are then carried out as described under Example 1. The results are summarized in Table 5.

TABLE 5

| Storage of catalyst A | Skinning time (min) | Shore A hardness | Tear strength (N/mm²) | Elongation at break (%) |
|---|---|---|---|---|
| 1 year at 25° C. | 9 | 30 | 2.3 | 350 |

What is claimed is:

1. A composition which has a long shelf life in the absence of water, but crosslinks in the presence of water at room temperature to form elastomers is prepared by mixing (1) an organopolysiloxane containing condensable terminal groups with (2) an organosilicon compound containing at least three hydrolyzable groups per molecule which are bonded directly to silicon, and (3) a condensation catalyst, wherein the condensation catalyst (3) is obtained from the reaction of a finely divided, inorganic oxide with a reactive titanium compound in the presence of an inert organic solvent.

2. The composition of claim 1, wherein the condensation catalyst (3) is prepared by mixing a finely divided, inorganic oxide with a reactive titanium compound in amounts of from 0.01 to 50 parts of titanium compound per 100 parts of finely divided inorganic oxide, at a temperature of from 0° to 300° C. for a period of from 1 minute to 24 hours.

3. The composition of claim 1, wherein the finely divided inorganic oxide is silicon dioxide having a specific surface area of at least 50 m²/g (BET).

4. The composition of claim 1, wherein the finely divided, inorganic oxide has been treated with an organosilicon compound to render the inorganic oxide hydrophobic.

5. The composition of claim 1, wherein the condensation catalyst (3) is prepared in the presence of an organosilicon compound to render the catalyst hydrophobic.

6. The composition of claim 1, wherein the reactive titanium compound has the general formula TiX₄, where X is a radical of the formula —OR or $$-OCR$$
$$\parallel$$
$$O$$

in which R is an alkyl radical having from 1 to 12 carbon atoms per radical, or one radical X is a chelate ligand selected from the group consisting of acetylacetonates of the formula

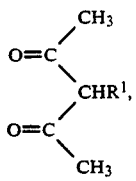

β-diketo groups and β-ketoester groups or two radicals X together are a dihydric alcohol as chelate ligand, where R¹ is a hydrogen atom or a monovalent hydrocarbon radical having from 1 to 12 carbon atoms per radical.

7. The composition of claim 1, wherein the organopolysiloxane (1) containing condensable terminal groups has the general formula $$HO(SiR^6{}_2O)_m SiR^6{}_2OH,$$

where the radical R⁶ is a monovalent hydrocarbon radical having from 1 to 18 carbon atoms per radical, a monovalent halogenated hydrocarbon radical having from 1 to 18 carbon atoms per radical and a cyanoalkyl radical, and m is an integer having a value of at least 10.

8. The composition of claim 1, wherein the organosilicon compound (2) is a silane of the general formula $$R^6{}_{4-n}SiZ_n$$

or a partial hydrolyzate thereof containing from 2 to 10 silicon atoms per molecule, where the radical R⁶ is a monovalent hydrocarbon radical having from 1 to 18 carbon atoms per radical, a monovalent halogenated hydrocarbon radical having from 1 to 18 carbon atoms per radical and a cyanoalkyl radical, n is 3 or 4, and the Z radicals are hydrolyzable groups selected from the group consisting of acyloxy groups (—OCOR⁷), hydrocarbonoxy groups (—OR⁸), in which R⁷ is a monovalent hydrocarbon radical having from 1 to 12 carbon atoms per radical, and R⁸ is an alkyl radical having from 1 to 4 carbon atoms per radical or an alkyl radical which is substituted by an ether oxygen atom.

9. A composition which has a long shelf life in the absence of water, but crosslinks in the presence of water at room temperature to form elastomers is prepared by mixing (1) an organopolysiloxane containing condensable terminal groups with (2) an organosilicon compound containing at least three hydrolyzable groups per molecule which are bonded directly to silicon, and (3) a condensation catalyst, wherein the condensation catalyst (3) is obtained from the reaction of a finely divided, inorganic oxide with a reactive titanium compound in the presence of an inert organic solvent, and at least one additional substance selected from the group consisting of reinforcing fillers, non-reinforcing fillers, plasticizers, pigments, soluble dyes, fragrances, fungicides, resinous organopolysiloxanes, organic resins, corrosion inhibitors, oxidation inhibitors, heat stabilizers, solvents, agents for affecting the electrical properties, flameproofing agents, light stabilizers and agents for extending the skinning time.

* * * * *